United States Patent [19]

Shibayama et al.

[11] 4,343,040
[45] Aug. 3, 1982

[54] TRANSVERSE EXCITATION TYPE LASER OSCILLATOR

[75] Inventors: Kouzaburo Shibayama; Toshimitsu Akiba; Haruhiko Nagai; Masao Hishii, all of Amagasaki, Japan

[73] Assignee: Mitsubishi Denki Kabushiki Kaisha, Tokyo, Japan

[21] Appl. No.: 277,605

[22] Filed: Jun. 26, 1981

Related U.S. Application Data

[63] Continuation of Ser. No. 47,820, Jun. 12, 1979.

[51] Int. Cl.³ .............................................. H01S 3/08
[52] U.S. Cl. ......................................... 372/87; 372/83
[58] Field of Search ................... 331/94.5 G, 94.5 D, 331/94.5 C; 313/210

[56] References Cited

U.S. PATENT DOCUMENTS 3,651,364  3/1978  Maloney ........................... 313/210

Primary Examiner—William L. Sikes
Assistant Examiner—León Scott, Jr.
Attorney, Agent, or Firm—Oblon, Fisher, Spivak, McClelland & Maier

[57] ABSTRACT

A high pressure transverse excitation type laser oscillator comprises a plane anode and a plurality of rod type cathodes to form glow discharge. Each cathode is covered with a cylindrical insulator having heat resistance except for a small discharge surface whereby the shift of the glow discharge caused by varying the pressure or the discharge current can be prevented to thus obtain stable glow discharge.

2 Claims, 3 Drawing Figures

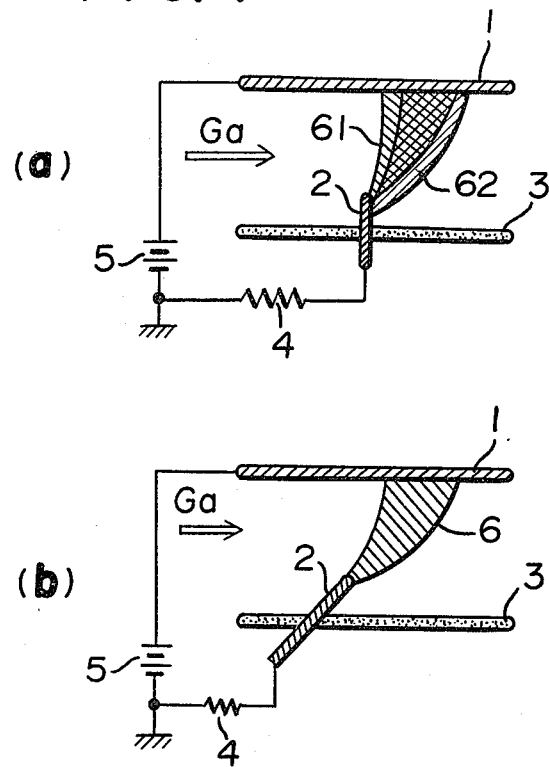
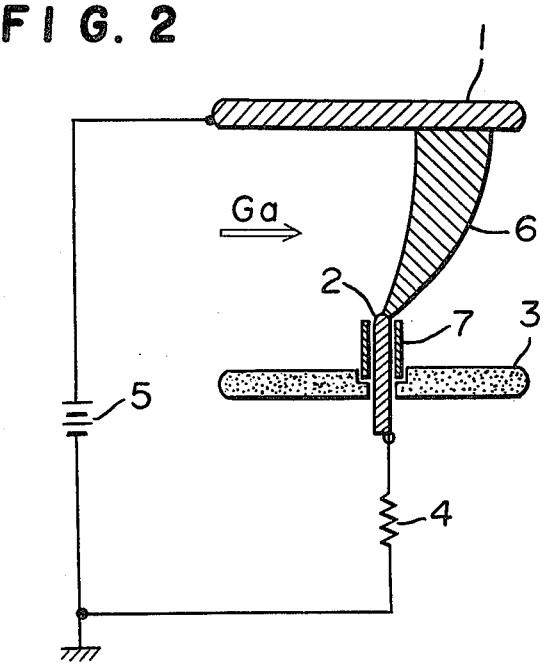

TRANSVERSE EXCITATION TYPE LASER OSCILLATOR

This is a continuation of application Ser. No. 047,820, filed June 12, 1979.

BACKGROUND OF THE INVENTION

1. Field of the Invention

The present invention relates to an improvement of a cathode structure of a transverse excitation type laser oscillator.

2. Description of the Prior Art

A $CO_2$ laser oscillator as a typical transverse excitation type laser oscillators will be described in detail.

In the transverse excitation type $CO_2$ laser oscillator, the injection discharge power to a laser medium per unit volume can be increased by using a highly pressurized laser medium and a cooling of the laser medium can be effectively performed by forcible circulation whereby a remarkably high output can be obtained in comparison with the conventional glass tube type $CO_2$ laser oscillator.

In this $CO_2$ laser oscillator, it is necessary to maintain the stable discharge in space uniformity, in high pressure and high speed gas flow. It is not easy to maintain the stable glow discharge when the pressure is high.

FIGS. 1(a), (1b) are sectional views of the important parts for illustrating the glow discharge of the usual transverse excitation type $CO_2$ laser oscillator and show one plane anode and the nearest one of rod cathodes which are arranged to face the anode.

In FIG. 1(a), the rod cathode is arranged in substantially perpendicular to the anode. In FIG. 1(b), the rod cathode is arranged in slant to the downstream of the gas flow.

In FIGS. 1(a), (1b), the reference numeral (1) designates a plane anode; (2) designates a rod cathode; (3) designates a support insulating substrate; (4) a stabilizing resistor; (5) designates a DC power source; and (6), (61), (62) designate glow discharge regions. The normal glow discharge (61) is sometimes shifted to (62). The arrow line Ga shows a flow direction of the laser medium. A laser resonator, which is not shown in the Figures, has its optical axis in the direction perpendicular to the drawing and comprises a pair of reflectors arranged to face each other.

In the laser oscillator having the above-mentioned structure, a mixed gas of $CO_2$, $N_2$ and He is used as the laser medium and the glow discharges are observed at a pressure of the laser medium of 0.1–1 atm. and a flow rate of 10–90 m/s. As result, in the structure of FIG. 1(a), the cathode spot of the glow discharge is vertically shifted on the surface of the cathode (2) in the downstream whereby the glow discharge region is not stable and is shifted between (61) and (62). The instability of the discharge region is increased depending upon increasing the pressure of the laser medium. The instability of the discharge region is serious trouble to increase the output of the laser oscillator.

The structure of FIG. 1(b), is considered to prevent such trouble. The cathode (2) is arranged in slan in the downstream of the gas flow, whereby the glow discharge region (6) is maintained at the top of the cathode (2) to prevent said trouble.

However, the following trouble is caused when a laser oscillator having greater output is considered even though said structure is given.

In the case of such cathode (2), it is necessary to increase field intensity near the cathode (2) in order to maintain the stable glow discharge touching the cathode glow on its top. Accordingly, it has been proposed to form a sharp top of the cathode (2) or to process a top of a fine wire having a diameter of about 1 mm so as to form a round top.

However, even though the cathode is processed in such shape, the glow discharge region (6) can be stable under maintaining the shower form as shown in FIG. 1(b) at only lower than about 10 mA of the discharge current per rod of the cathode in the case of about 1 atm. of the pressure of the laser medium. When the discharge current is larger than about 10 mA, a pulse discharge in a filamental form is intermittently formed. Such phenomenon is found in a step converting from the glow discharge to an arc discharge. When the discharge current is increased over said value, the arc discharge is formed whereby a laser output is not obtained. Accordingly, the discharge current per rod cathode is limited to about 10 mA. In order to increase the output of the laser oscillator, it is necessary to increase the number of the cathodes and to require larger size of the laser oscillator. This is a serious trouble for constructing a laser oscillator having large output.

SUMMARY OF THE INVENTION

In accordance with the present invention, cathodes are respectively covered with an insulator having heat resistance except discharging surfaces having each small area whereby the glow discharge current per each cathode can be remarkably increased to be effective for a laser oscillator having large output and a life of the cathodes can be remarkably prolonged.

BRIEF DESCRIPTION OF THE DRAWING

FIG. 1(a) is a sectional view of an important part of a $CO_2$ laser oscillator as one of the usual transverse excitation type laser oscillator;

FIG. 1(b) is a sectional view of an important part of an improved laser oscillator; and FIG. 2 is a sectional view of an important part of one embodiment of the present invention.

DETAILED DESCRIPTION OF THE PREFERRED EMBODIMENTS

FIG. 2 is a sectional view of an important part of one embodiment of the present invention. In FIG. 2, the reference numeral (7) designates a cylindrical porcelain insulator. The top of the cathode (2) can be processed to form a desired round corner. The plane anode (1) faces to the rod type cathodes (2) held on the support insulating substrate (3) and the cathodes (2) are connected through a stabilizing resistor (4) to the power source (5). The laser medium Ga is fed in the transverse direction between the plane anode (1) and the cathodes (2) held on the support insulating substrate (3). The cathodes (2) are usually rod cathodes covered with cylindrical insulators (7) having round corner at the top and can be in another form, that is, rod cathodes covered with a insulating plate except the top of the round rod cathodes. The cathodes (2) are usually held by the support insulating substrate (3) and the cylindrical insulators (7) reach to the support insulating substrate (3). The kinds and the shapes of the insulator (7) are not critical but they are preferably thin insulators contacting with the cathodes except the tops of the cathodes. The diameter of the cathode is not critical and is preferable in a range of about 2–5 mm in a practical device. The top of the cathode (2) is preferable to project above the cylindrical insulator (7) for only about 0.5 mm. In this case, it is not always necessary to arrange the cathode (2) in slant. The preparation of the cathodes is easy.

In the laser oscillator having such structure, the glow discharge region (6) is stabilized at the top of the cathode (2) as shown in FIG. 2 and is not shifted. The top of the cathode (2) has a desired round corner whereby the field concentration is relatively mild. It is confirmed that the stable shower form glow discharge region (6) can be formed at large discharge current such as 80 mA/rod in said condition.

By using the cathode having the structure covering the cathode with an insulator except only small discharge surface, the glow discharge is formed on whole surface of the top of the cathode when the pressure of the laser medium is low or the discharge current is large. On the other hand, the discharge surface is reduced to the downstream side at the top of the cathode when the pressure of the laser medium is high or the discharge current is small. Thus, the stable discharge current can be obtained even though the discharge current or the pressure is highly varied.

In the above-mentioned embodiment, a porcelain insulator (7) is used as an insulator for covering the cathode (2). It is also possible to use another insulator having heat resistance which does not cause a generation of toxic gas.

In accordance with the present invention, stable glow discharge is obtained whereby a laser output having higher than 1 Kw can be obtained by the laser oscillator.

In general, a laser output is substantially proportional to the glow discharge current. In order to increase the laser output, the glow discharge current should be increased. On the other hand, it is preferable to reduce numbers of the cathodes for decreasing numbers of parts and increasing reliability. In accordance with the present invention, area of the discharge surfaces of the cathodes are limited by covering each cylindrical porcelain insulator on each rod type cathode having round corner at the top whereby the glow discharge is not shifted from the exposed tops of the cathodes and the stable glow discharge current per rod is remarkably increased for more than several times of that of the non-covered cathodes and the required numbers of the cathodes can be reduced. Moreover, the life of the cathodes is remarkably prolonged because of round corners of the tops of the rod type cathodes.

What is claimed is:

1. In a transverse excitation type laser oscillator having a plane anode, a plurality of cathodes arranged in a row so that the length of each cathode is essentially perpendicular to said plane anode, a laser medium fed in transverse direction between the row of said cathodes and said plane anode to generate a glow discharge path between said plane anode and said cathodes by applying a DC voltage between said plane anode and each of said cathodes, an improvement comprising: a glow discharge stabilizing insulator on each of said cathodes for restricting movement of said glow discharge region caused by said transfer of said laser medium wherein said insulator substantially covers each of said cathodes except for the portion of a cathode nearest said plane anode to thereby satabilize said glow discharge region at high medium pressures and high discharge currents.

2. A transverse excitation type laser oscillator according to claim 1 wherein the said cathodes are covered with cylindrical porcelain insulators except their round tops.

* * * * *